United States Patent
Kreider et al.

[15] 3,679,697
[45] July 25, 1972

[54] 1-(β-HALOPHENETHYL)IMIDAZOLES

[72] Inventors: Eunice M. Kreider, Chicago; Robert C. Tweit, Wilmette, both of Ill.

[73] Assignee: G. D. Searle & Co., Chicago, Ill.

[22] Filed: Oct. 8, 1970

[21] Appl. No.: 79,259

[52] U.S. Cl. ............................................260/309, 424/273
[51] Int. Cl. ........................................................C07d 49/36
[58] Field of Search....................................................260/309

[56] References Cited

UNITED STATES PATENTS 3,575,999   4/1971   Godefroi et al.........................260/309

*Primary Examiner*—Henry R. Jiles
*Assistant Examiner*—Harry I. Moatz
*Attorney*—John M. Brown, John J. Kolano, Elliot N. Schubert, Lowell C. Bergstedt, Sybil Meloy, Walter C. Ramm and Helmuth A. Wegner

[57] ABSTRACT

Preparation of the captioned compounds — for example, 1-(β-chloro-4-nitrophenethyl)imidazole oxalate — and their valuable biological properties — including antiulcerogenic, antibacterial, antiprotozoal, antifungal, antialgal, and antigerminant activities — are disclosed.

11 Claims, No Drawings

1-(β-HALOPHENETHYL)IMIDAZOLES

This invention relates to 1-(β-halophenethyl)-imidazoles and congeners, and to processes for the preparation thereof. More particularly, this invention provides new, useful, and unobvious chemical compounds of the formula

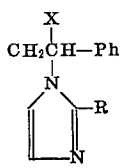

wherein X represents chlorine or bromine, R represents hydrogen or lower alkyl, and Ph represents phenyl optionally substituted by lower alkyl, halogen, nitro, lower alkoxy, or (lower alkyl)sulfonyl. As many as 5 such substituents, alike or different, can be present; but fewer than 3 are preferred.

The lower alkyls contemplated by R and Ph include methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight-or branched-chain, hydrocarbon groupings of the formula $$-C_nH_{2n+1}$$

wherein a represents a positive integer less than 8. It follows that the lower alkoxys and (lower alkyl)sulfonyls contemplated by Ph are radicals of the formula

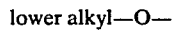

and

respectively, wherein the lower alkyl constituent has the meaning previously assigned.

Equivalent to the foregoing compounds for the purposes of this invention are corresponding acid addition salts of the formula

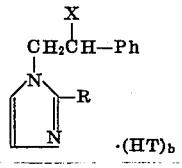

wherein X, R, and Ph are defined as before; T represents one equivalent of an anion — for example, chloride, bromide, iodide, nitrate, phosphate, sulfate, sulfamate, methyl sulfate, ethyl sulfate, benzenesulfonate, toluenesulfonate, acetate, lactate, glycolate, oxalate, succinate, malate, maleate, tartrate, citrate, gluconate, ascorbate, benzoate, cinnamate, or the like — which, in combination with the cationic portion of a salt aforesaid, is neither biologically nor otherwise undesirable; and b represents a positive integer less than 3, its precise value being dependent upon the number of basic nitrogens involved in salt formation.

Equivalent to the foregoing compounds (including salts) for the purposes of this invention are solvates thereof in which biologically insignificant solvent is present.

The compounds to which this invention relates are useful by reason of their valuable biological properties. Thus, for example, they are antiulcerogenic; and they inhibit the growth of bacteria such as *Escherichia coli*, *Salmonella paratyphi* A and *Erwinia sp.*; protozoa such as *Trichomonas vaginalis* and *Tetrahymena pyriformis*; fungi such as *Trichophyton mentagrophytes*, *Candida albicans*, *Fusarium sp.*, and *Verticillium albo-atrum*; algae such as *Chlorella vulgaris*; and dicotyledoneae such as *Trifolium repens*.

Those skilled in the art will recognize that observations of activity in standardized tests for particular biological effects are fundamental to the development of valuable new drugs, both veterinary and human. Distinct from such applications, antialgal compounds are adapted to the conditioning of boiler feed water and the like, whereas antigerminant compounds serve as herbicides.

The antiulcerogenic utility of the instant compounds is evident from the results of a standardized test therefor carried out as described in column 2, lines 20–54, of U.S. Pat. No. 3,483,192.

The antibacterial utility of the instant compounds is evident from the results of standardized tests whereby nutrient broth (manufactured by Baltimore Biological Laboratories or Difco) is prepared at twice the concentration recommended by the manufacturer, sterilized, and inoculated with 2 percent (by volume) of a culture of *E. coli*, *S. paratyphi* A, or *Erwinia sp.*. Meanwhile, compound is heated in sterile distilled water at a concentration of 2,000 γ per ml. and a temperature of 80° C. for 20 min. An equivolume mixture of this compound preparation and the inoculated broth is incubated aerobically at 37° C. and then examined grossly for the growth of the test organism. The incubation period is 24–48 hr. for *Erwinia sp.* and 20–24 hr. for the other two organisms. If growth of the test organism is observed, the compound is considered inactive. If no such growth is observed, the incubated mixture is serially diluted and mixed with an inoculated broth of the same composition as before excepting that the concentration is halved and 1 percent (by volume) of the culture instead of 2 percent is incorporated. Amounts of the latter broth added are such that concentrations of 100, 10, and 1 γ of compound per ml. result. The mixtures thus obtained are incubated as before and then examined grossly for growth of the test organism. Potency is expressed as the minimum concentration at which no growth of test organism is discernible. Controls are provided by concurrent incubations identical with the foregoing except for the absence of compound.

The antiprotozoal utility of the instant compounds is evident from the results of a standardized test therefor carried out as described in column 3, line 46, through column 4, line 2, of U.S. Pat. No. 3,483,192, using *T. vaginalis* as the test organism. Further evidence of the antiprotozoal utility of the instant compounds is provided by a standardized test whereby a nutrient broth consisting of 12 gm. of proteose peptone, 8 gm. of sucrose, and 500 ml. of water is sterilized and inoculated with 10 percent (by volume) of an axenic culture of *T. pyriformis*. Meanwhile, compound is heated in sterile distilled water at a concentration of 2,000 γ per ml. and a temperature of 80° C. for 20 min. An equivolume mixture of this compound preparation and the inoculated medium is incubated aerobically at 32° C. for 48 hr. and then examined microscopically for the presence of motile tetrahymena. If any are observed, the compound is considered inactive. If no motile tetrahymena are observed, the incubated mixture is serially diluted and mixed with an inoculated medium of the same composition as that described above excepting that 100 parts of distilled water instead of 500 parts and 5 percent (by volume) of the culture instead of 10 percent are incorporated. Amounts of the latter medium added are such that concentrations of 100, 10, and 1 γ of compound per ml. result. The mixtures thus obtained are incubated as before and then examined microscopically for motile tetrahymena. Potency is expressed as the minimum concentration at which no motile tetrahymena are discernible. Controls are provided by concurrent incubations identical to the foregoing except for the absence of compound.

The antifungal utility of the instant compounds is evident from the results of standardized tests whereby two concentrations of Sabouraud dextrose agar (manufactured by Baltimore Biological Laboratories or Difco) are prepared, one as recommended by the manufacturer and the other at twice this concentration. These preparations are sterilized and then maintained in a fluid state at 80° C. Meanwhile, compound is heated in sterile distilled water at a concentration of 2,000 γ per ml. and a temperature of 80° C. for 20 min. An equivolume mixture of this compound preparation and the double-strength agar is serially diluted and mixed with the single-strength agar in amounts such that concentrations of 1000, 100, 10, and 1 γ of test compound per ml. result. The mixtures thus obtained are allowed to cool and solidify, whereupon they are surface-inoculated with a suspension of *T. mentagrophytes, C. albicans, Fusarium sp.*, or *V. albo-atrum* and then incubated aerobically at room temperatures. The incubation period is 6–7 days for *T. mentagrophytes*, 48 hr. for *C. albicans*, and 5–7 days for *Fusarium sp.* and *V. albo-atrum*. Activity is determined by gross examination, and the potency is expressed as the minimum concentration at which no growth of the test organism is discernible. Controls are provided by concurrent incubations identical with the foregoing except for the absence of compound.

The antialgal utility of the instant compounds is evident from the results of a standardized test for their capacity to prevent the growth of *Chlorella vulgaris*. In this test, a nutrient medium consisting of 0.25 gm. of sodium nitrate, 0.025 gm. of calcium chloride, 0.175 gm. of monobasic potassium phosphate, 0.075 gm of dibasic potassium phosphate, 0.075 gm. of magnesium sulfate, 0.025 gm. of sodium chloride, 0.005 gm. of ferric chloride, 3.0 gm. of yeast extract (Difco), and 10.0 ml. of a soil extract prepared by sterilizing a mixture of soil and distilled water and removing insoluble solids therefrom plus sufficient additional distilled water to bring the final volume to 500 ml., is sterilized and then inoculated with 2 percent (by volume) of an axenic culture of *C. vulgaris*. Meanwhile, compound is heated in sterile distilled water at a concentration of 2,000 γ per ml. and a temperature of 80° C. for 20 min. An equivolume mixture of the inoculated medium and the compound preparation is incubated aerobically at room temperatures under constant illumination for 4–7 days and then examined grossly for growth of the test organism. If such growth is observed, the compound is considered inactive. If no growth is observed, the incubated mixture is serially diluted and mixed with an inoculated medium of the same composition as that described above excepting that it is made up to a volume of 1,000 ml. instead of 500, and 1 percent (by volume) of the culture instead of 2 percent is incorporated. Amounts of the latter medium added are such that concentrations of 100, 10 and 1 γ of compound per ml. result. The mixtures thus obtained are incubated as before and then examined grossly for growth of the test organism. Potency is expressed as the minimum concentration at which no growth of test organism is discernible. Controls are provided by concurrent incubations identical with the foregoing except for the absence of compound.

The antigerminant utility of the instant compounds is evident from the results of a standardized test whereby: 2 ½ sterile filter paper discs 42.5 mm. in diameter are stacked in each of 3 60×15 mm. Petri dishes, compound is heated in sterile distilled water at a concentration of 2,000 γ/ml. and a temperature of 80° C. for 20 min., 0.5 ml. of the compound preparation followed by 0.5 ml. of sterile distilled water is added to one of the filter paper stacks, 0.5 ml. of a 2,000 γ/ml. aqueous solution of 2,4-dichlorophenoxyacetic acid followed by 0.5 ml. of sterile distilled water is added to a second filter paper stack, 1 ml. of sterile distilled water is added to the third filter paper stack, approximately 10 white clover (Trifolium repens, a representative dicotyledon) seeds are placed atop each stack, and the dishes are covered with glass lids and then incubated in moist air at room temperatures until the aqueous control seeds germinate (4–7 days). The capacity of a compound to inhibit germination is determined by comparison with the aqueous and 2,4-dichlorophenoxyacetic acid controls.

Preparation of the compounds of this invention proceeds by heating a 1-imidazoleethanol of the formula

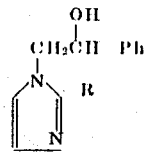

(wherein R and Ph are defined as before) with a thionyl halide of the formula $$SOX_2$$

(wherein X is defined as before). A solvent such as chloroform can be added if desired to promote contact between the reagents. The product can be isolated as the free base by evaporation of excess thionyl halide, addition of excess aqueous sodium bicarbonate, extraction with chloroform, and removal of solvent via vacuum distillation. Alternatively, the product can be isolated as the corresponding hydrohalide salt by adding an alcohol or other inert liquid in which the salt is relatively insoluble q.s. precipitation. Conversion of the bases to acid addition salts can be accomplished by dissolving them in alcohol or other inert solvent, acidifying with any of various inorganic and strong organic acids wherein the anion can be represented by T as hereinbefore defined, and adding excess ether or the like if required to effect precipitation. The salts can be converted to bases by dissolving in aqueous N,N-dimethylformamide and neutralizing with sodium carbonate.

The 1-imidazoleethanol starting materials can be prepared by contacting in a solvent such as dioxane, ether, or a mixture thereof an appropriate acetophenone of the formula $$PhCOCH_3$$

(wherein Ph is defined as before) with bromine, using aluminum chloride as a catalyst if desired, adding the resultant 2-bromoacetophenone to a methanol solution of an appropriate imidazole

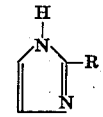

(wherein R is defined as before), and reducing the 2-(1-imidazolyl)acetophenone with sodium tetrahydroborate in methanol.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

1-(β-Chlorophenethyl)imidazole. A mixture of 19 parts of α-phenyl-1-imidazoleethanol [J. Med. Chem., 12, 784 (1969)] and 82 parts of thionyl chloride is heated 3 hours at the boiling point under reflux, whereupon excess thionyl chloride is distilled off; and the residue is dissolved in excess aqueous sodium bicarbonate. The resultant mixture is extracted with chloroform. The chloroform solution is washed well with water, dried over sodium sulfate, and stripped of solvent by vacuum distillation. The residue is 1-(β-chlorophenethyl)-imidazole, having the formula

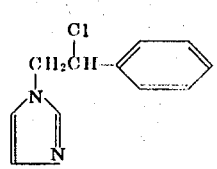

EXAMPLE 2

1-(β-Bromophenethyl)imidazole. Substitution of 135 parts of thionyl bromide for the thionyl chloride called for in Example 1 affords, by the procedure there detailed, 1-(β-bromophenethyl)imidazole, having the formula

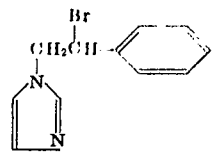

EXAMPLE 3

1-(β-Chloro-4-methylphenethyl)imidazole. Substitution of 20 parts of α-(p-tolyl)-1-imidazoleethanol (J. Med. Chem., loc. cit.) for the α-phenyl-1-imidazoleethanol called for in Example 1 affords, by the procedure there detailed, 1-(β-chloro-4-methylphenethyl)imidazole, having the formula

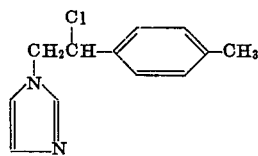

EXAMPLE 4

A. 2'-Fluoro-2-(1-imidazolyl)acetophenone. To a mixture of 48 parts of 2'-fluoroacetophenone, 65 parts of dioxane, and approximately 95 parts of ether at 10°–20° is slowly added, with stirring, 56 parts of bromine, whereupon stirring is continued at room temperatures for one-half hour while hydrogen bromide is evolved. At this point, a solution of 118 parts of imidazole in 140 parts of methanol is added with vigorous stirring, temperatures again being maintained in the 10°–20° range. When the second addition is complete, stirring is continued at room temperatures for 18 hours. The resultant mixture is partitioned between water and chloroform. The chloroform phase is separated, washed well with hot water, dried over sodium sulfate, and stripped of solvent by vacuum distillation. The brown residue is 2'-fluoro-2-(1-imidazolyl)acetophenone.

B. α-(2-Fluorophenyl)-1-imidazoleethanol. To a solution of 680 parts of 2'-fluoro-2-(1-imidazolyl)acetophenone in 2,400 parts of methanol at 10°–20° is added, portionwise with stirring, 84 parts of sodium tetrahydroborate. Stirring is continued for 1 ½ hours at room temperatures after the addition is complete, whereupon the reaction mixture is heated at the boiling point under reflux for 2 hours and then stripped of solvent by vacuum distillation. The residue is dissolved in 2,000 parts of water. The aqueous solution is acidified with concentrated hydrochloric acid, then heated one-half hour at 90°–95°, and finally made alkaline with concentrated ammonium hydroxide. On chilling, α-(2-fluorophenyl)-1-imidazoleethanol precipitates which, filtered off and recrystallized from a mixture of methanol and ether using decolorizing charcoal in process, melts at approximately 137°–138°.

C. 1-(β-Chloro-2-fluorophenethyl)imidazole. Substitution of 26 parts of α-(2-fluorophenyl)-1-imidazole-ethanol for the α-phenyl-1-imidazoleethanol called for in Example 1 affords, by the procedure there detailed, 1-(β-chloro-2-fluorophenethyl)imidazole.

D. 1-(β-Chloro-2-fluorophenethyl)imidazole oxalate. A solution of 10 parts of 1-(β-chloro-2-fluorophenethyl)imidazole in 10 volumes of methanol is acidified with oxalic acid. The resultant solution is diluted with ether q.s. incipient precipitation. On chilling, 1-(β-chloro-2-fluorophenethyl)imidazole oxalate precipitates. Filtered off and recrystallized from a mixture of methanol and ether, it melts at 151°–152.5°. The product has the formula

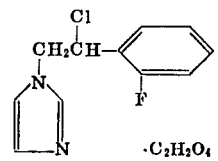

EXAMPLE 5

A. 1-(β-Chloro-4-fluorophenethyl)imidazole. Substitution of approximately 29 parts of α-(4-fluorophenyl)-1-imidazoleethanol (J. Med. Chem., loc. cit.) for the α-phenyl-1-imidazoleethanol called for in Example 1 affords, by the procedure there detailed, 1-(β-chloro-4-fluorophenethyl)imidazole.

B. 1-(β-Chloro-4-fluorophenethyl)imidazole oxalate. Substitution of 10 parts of 1-(β-chloro-4-fluorophenethyl)imidazole for the 1-(β-chloro-2-fluorophenethyl)-imidazole called for in Example 4D affords, by the procedure there detailed, 1-(β-chloro-4-fluorophenethyl)imidazole oxalate melting at approximately 149.5°–150.5°. The product has the formula

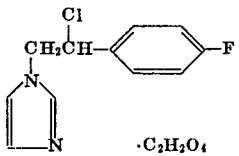

EXAMPLE 6

1-(2,β-Dichlorophenethyl)imidazole hydrochloride. To 57 parts of α-(2-chlorophenyl)-1-imidazoleethanol (J. Med. Chem., loc. cit.) is slowly added approximately 197 parts of thionyl chloride. The resultant mixture is allowed to stand for 12 hours, then heated at 95°. At this point, 160 parts of methanol is introduced; and a precipitate eventuates. When gas evolution ceases, the precipitate is filtered off and dried in air. The product thus isolated is 1-(2,β-dichlorophenethyl)imidazole hydrochloride melting at 193°–196° with decomposition. It has the formula

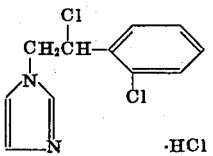

EXAMPLE 7

A. 1-(4,β-Dichlorophenethyl)imidazole. Substitution of approximately 48 parts of α-(4-chlorophenyl)-1-imidazoleethanol (J. Med. Chem., loc. cit.) for the α-phenyl-1-imidazoleethanol called for in Example 1 affords, by the procedure there detailed, 1-(4,β-dichlorophenethyl)imidazole.

B. 1-(4,β-Dichlorophenethyl)imidazole oxalate. Substitution of 10 parts of 1-(4,β-dichlorophenethyl)imidazole for the 1-(β-chloro-2-fluorophenethyl)imidazole called for in Example 4D affords, by the procedure there detailed, 1-(4,β-dichlorophenethyl)imidazole oxalate melting at 164°–166° with decomposition. The product has the formula

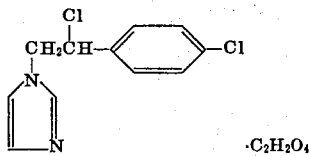

EXAMPLE 8

A. 1-(2,4,β-Trichlorophenethyl)imidazole. Substitution of 20 parts of α-(2,4,-dichlorophenyl)-1-imidazoleethanol (J. Med. Chem., loc. cit.) for the α-phenyl-1-imidazoleethanol called for in Example 1 affords, by the procedure there detailed, 1-(2,4,β-trichlorophenethyl)-imidazole.

B. 1-(2,4,β-Trichlorophenethyl)imidazole nitrate. A solution of 10 parts of 1-(2,4,β-trichlorophenethyl)imidazole in 10 volumes of ethanol is acidified with concentrated nitric acid and then diluted with ether q.s. incipient precipitation. On cooling,1-(2,4β-trichlorophenethyl)-imidazole nitrate precipitates which, recrystallized from a mixture of methanol and ether, melts at 141°–142.5°. The product has the formula

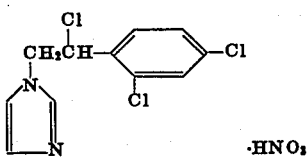

EXAMPLE 9

A. 3',4'-Dichloro-2-(1-imidazolyl)acetophenone. To a mixture of 200 parts of 3',4'-dichloroacetophenone, one-tenth part of aluminum chloride, and 900 parts of dioxane is added, slowly with stirring, 171 parts of bromine. The resultant solution is stirred into a solution of 350 parts of imidazole in 400 parts of methanol, temperatures being maintained in the range 10°–20° throughout. The mixture thus obtained is diluted with 1,000 parts of water and then filtered. The filtrate is concentrated by vacuum distillation to the point of incipient precipitation and then chilled. The product thrown down, filtered off and recrystallized from acetone, is 3',4'-dichloro-2-(1-imidazolyl)acetophenone melting at 124°–126°.

B. α-(3,4-Dichlorophenyl)-1-imidazoleethanol. To a solution of 92 parts of 3',4'-dichloro-2-(1-imidazolyl)-acetophenone in 550 parts of ethanol is added, with stirring, 9 parts of sodium tetrahydroborate. The reaction mixture is allowed to stand for 2 hours, then is heated at 90°–95° for 1 hour. At this point, 100 parts of water is introduced; and most of the organic solvent is thereupon removed by vacuum distillation. Dilution of the distilland with approximately 350 parts of water induces precipitation of a solid which, filtered off and dried in air, melts at 147°–150°. The product thus isolated is α-(3,4-dichlorophenyl)-1-imidazoleethanol.

C. 1-(3,4,β-Trichlorophenethyl)imidazole hydrochloride. To approximately 93 parts of α-(3,4-dichlorophenyl)-1-imidazoleethanol is slowly added 164 parts of thionyl chloride. The resultant mixture is heated at 95° for 1 hour, whereupon 160 parts of methanol is introduced. A solid precipitates. Filtered off and dried in air, it melts at 186.5°–188.5° with gas evolution. The product thus isolated is 1-(3,4,β-trichlorophenethyl)imidazole hydrochloride, having the formula

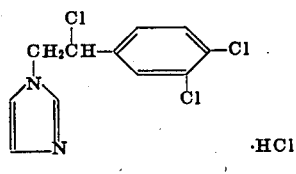

EXAMPLE 10

A. 3',4'-Dichloro-2-(2-methyl-1-imidazolyl)-acetophenone. To a solution of 60 parts of 2-methylimidazole and 39 parts of sodium methoxide in 475 parts of N,N-dimethylformamide is added a solution of 190 parts of 2-bromo-3',4'-dichloroacetophenone in approximately 715 parts of N,N-dimethylformamide. The resultant solution, protected from moisture, is stirred at room temperatures for 48 hours, then partitioned between water and chloroform. The chloroform phase is washed well with water, dried over sodium sulfate, and stripped of solvent by vacuum distillation. The residue is dissolved in benzene; and the benzene is chromatographed on silica gel, using benzene and mixtures thereof with increasing amounts of ethanol as developing solvents. From an eluate comprising 10 percent ethanol in benzene, on evaporation of solvent, there is obtained as the residue 3',4'-dichloro-2-(2-methyl-1-imidazolyl)acetophenone.

B. α-(3,4,-Dichlorophenyl)-2-methyl-1-imidazoleethanol. To a solution of 286 parts of 3',4'-dichloro-2-(2-methyl-1-imidazolyl)acetophenone in 2,000 parts of methanol at temperatures in the range 10°–20° is added, portionwise with stirring, 100 parts of sodium tetrahydroborate. The reaction mixture is thereupon stirred at room temperatures for 1 ½ hours, heated at the boiling point under reflux for 2 hours, and finally stripped of solvent by vacuum distillation. The residue is taken up in a minimum of water; and the solution thus obtained is acidified with concentrated hydrochloric acid, heated one-half hour at 90°–95°, made alkaline with concentrated ammonium hydroxide, and finally chilled. The precipitate thrown down is filtered off and dried in air. The product thus isolated is α-(3,4,-dichlorophenyl)-2-methyl-1-imidazoleethanol.

C. 1-(3,4,β-Trichlorophenethyl)-2-methylimidazole. Substitution of approximately 15 parts of α-(3,4-dichlorophenyl)-2-methyl-1-imidazoleethanol for the α-phenyl-1-imidazoleethanol called for in Example 1 affords, by the procedure there detailed, 1-(3,4,β-trichlorophenethyl)-2-methylimidazole.

D. 1-(3,4,β-Trichlorophenethyl)-2-methylimidazole oxalate. Substitution of 10 parts of 1-(3,4,β-trichlorophenethyl)-2-methylimidazole for the 1-(β-chloro-2-fluorophenethyl)-imidazole called for in Example 4D affords, by the procedure there detailed, 1-(3,4,β-trichlorophenethyl)-2-methylimidazole oxalate melting at 155°–157 °. The product has the formula

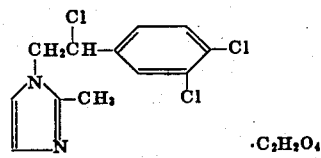

EXAMPLE 11

1-(4-Bromo-β-chlorophenethyl)imidazole hydrochloride. To 225 parts of α-(4-bromophenyl)-1-imidazole-ethanol (J. Med. Chem., loc. cit.) is slowly added 270 parts of thionyl chloride. The resultant mixture is heated at 95° for 2 hours, whereupon 320 parts of ethanol is introduced. When gas evolution ceases, the mixture is heated at 80° for 1 hour, then chilled. The precipitate thrown down is 1-(4-bromo-β-chlorophenethyl)imidazole hydrochloride which, filtered off and dried in air, melts at 187°–190° with decomposition. The product has the formula

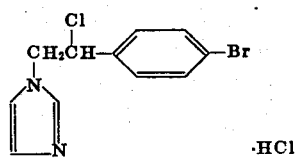

EXAMPLE 12

A. 4'-Iodo-2-(1-imidazolyl)acetophenone. Substitution of 74 parts of 4'-iodacetophenone for the 2'-fluoroacetophenone called for in Example 4A affords, by the procedure there detailed, 4'-iodo-2-(1-imidazolyl)-acetophenone. -( B. β-(4-Iodophenyl)-1-imidazoleethanol. Substitution of 1,040 parts of 4'-iodo-2-(1-imidazolyl)-acetophenone for the 2'-fluoro-2-(1-imidazolyl)acetophenone called for in Example 4B affords, by the procedure there detailed, α-(4-iodophenyl)-1-imidazoleethanol.

C. 1-(β-Chloro-4-iodophenethyl)imidazole. Substitution of 31 parts of α-(4-iodophenyl)-1-imidazole-ethanol for the α-phenyl-1-imidazoleethanol called for in Example 1 affords, by the procedure there detailed, 1-(β-chloro-4-iodophenethyl)imidazole, having the formula

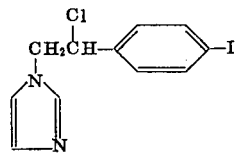

EXAMPLE 13

A. 2-(1-Imidazolyl)-4'-nitroactophenone. To a slurry of 116 parts of imidazole in 95 parts of N,N-dimethylformamide at 15°-20 is added, portionwise with vigorous stirring, a slurry of 83 parts of 2-bromo-4'-nitroacetophenone in 95 parts of N,N-dimethylformamide. When the addition is complete, temperatures are maintained in the 15°-20° range with stirring for 2 hours, whereupon the reaction mixture is poured into approximately 12 volumes of a 6:1 mixture of water and benzene. The resultant mixture is chilled overnight. Precipitation occurs. The precipitate is filtered off and taken up in 1,200 parts of toluene. The toluene solution is azeotropically dried and concentrated by distillation to the point of incipient precipitation. On chilling, precipitation occurs. The precipitate, 2-(1-imidazolyl)-4'-nitroacetophenone, is isolated by filtration and dried in air.

B. α-(4-Nitrophenyl)-1-imidazoleethanol. To a solution of 64 parts of 2-(1-imidazolyl)-4'-nitroacetophenone in 360 parts of methanol at 20°-30°is added, portionwise with vigorous stirring, 10 parts of sodium tetrahydroborate. When the addition is complete, stirring is continued for 1 ½ hours, whereupon the reaction mixture is heated at the boiling point under reflux for an additional 1 ½ hours. Solvent is then removed by vacuum distillation, 400 parts of water is added to the residue, and the resultant solution is acidified with concentrated hydrochloric acid, then heated at 85°-90° for one-half hour, thereupon made alkaline with ammonium hydroxide, and finally chilled. The precipitate thrown down is α-(4-nitrophenyl)-1-imidazoleethanol which, filtered off and recrystallized from a mixture of methanol and ether using decolorizing charcoal in process, melts at approximately 186°-187°.

C. 1-(β-Chloro-4-nitrophenethyl)imidazole. To a solution of 52 parts of α-(4-nitrophenyl)-1-imidazole-ethanol in 149 parts of chloroform is slowly added 164 parts of thionyl chloride. The resultant solution is heated at the boiling point under reflux for 3 hours, then let stand overnight at room temperatures. Solvent is thereupon removed by vacuum distillation, and the residue is taken up in excess aqueous sodium bicarbonate. The bicarbonate solution is extracted with chloroform. The chloroform solution is washed with water, dried over sodium sulfate, and stripped of solvent by vacuum distillation. The residue is 1-(β-chloro-4-nitrophenethyl)imidazole.

D. 1-(β-Chloro-4-nitrophenethyl)imidazole oxalate. A solution of 10 parts of 1-(β-chloro-4-nitrophenethyl)-imidazole in 10 volumes of methanol is acidified with oxalic acid, then diluted with ether to the point of incipient precipitation, and finally chilled. The precipitate is filtered out and recrystallized from hot water to give 1-(β-chloro-4-nitrophenethyl)imidazole oxalate melting at approximately 183.5°-184° with decomposition. It has the formula

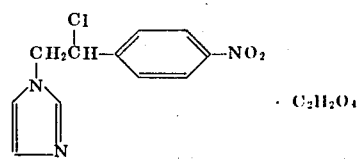

EXAMPLE 14

1-(β-Chloro-2-methoxyphenethyl)imidazole. Substitution of 22 parts of α-(2-methoxyphenyl)-1-imidazole-ethanol (J. Med. Chem., loc. cit.) for the α-phenyl-1-imidazoleethanol called for in Example 1 affords, by the procedure there detailed, 1-(β-chloro-2-methoxyphenethyl)-imidazole. The product has the formula

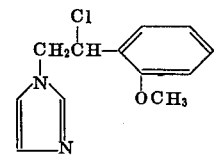

EXAMPLE 15

A. 2-(1-Imidazolyl)-4'-methylsulfonylacetophenone monohydrate. To a mixture of approximately 109 parts of 4'-methylsulfonylacetophenone and 450 parts of dioxane is slowly added, with stirring, 88 parts of bromine. The resultant mixture is added, with stirring, to a solution of 175 parts of imidazole in 240 parts of methanol, temperatures of the reaction mixture being maintained in the range 5°-15° throughout. The next day, 2,000 parts of water and approximately 750 parts of chloroform is mixed in. A solid precipitates. The precipitate is isolated by filtration, recrystallized from methanol, and washed by trituration with hot acetone to give 2-(1-imidazolyl)-4'-methylsulfonylacetophenone monohydrate melting at 189.5°-192.5°.

B. α-(4-Methylsulfonylphenyl)-1-imidazoleethanol hemihydrate. To a mixture of 504 parts of 2-(1-imidazolyl)-4'-methylsulfonylacetophenone monohydrate and 2800 parts of methanol is added, with stirring during 2 ½ hours, 45 parts of sodium tetrahydroborate. The resultant mixture is stirred for 2 hours, then heated at 85°-90° while solution occurs and approximately 800 parts of methanol distills off. The distilland is diluted with 1,000 parts of water and chilled. The precipitate which forms is β-(4-methyl-sulfonylphenyl)-1-imidazoleethanol hemihydrate which, isolated by filtration, recrystallized from methanol, and dried in air melts at 179°-181.5°.

C. 1-(β-Chloro-4-methylsulfonylphenethyl)imidazole. To 310 parts of α-(4-methylsulfonylphenyl)-1-imidazoleethanol hemihydrate is very slowly added 360 parts of thionyl chloride. When addition is complete, the reaction mixture is heated at 95° for 15 min., then diluted with 480 parts of ethanol. Precipitation occurs. The next day, the precipitate is filtered off and taken up in 1,425 parts of hot N,N-dimethylformamide. This solution is diluted with 3,000 parts of water and thereupon neutralized with sodium carbonate. The crystalline precipitate thrown down is 1-(β-chloro-4-methylsulfonylphenyl)-imidazole which, filtered off and dried in air, melts at approximately 144°-144.5°. The product has the formula

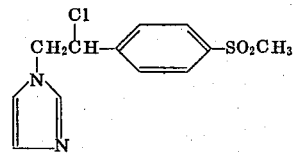

EXAMPLE 16

A. 4'-Ethylsulfonylacetophenone. A mixture of 100 parts of 4'-ethylthioacetophenone, 250 parts of acetic acid, and approximately 190 parts of 30 percent hydrogen peroxide is heated at 85°–95° until an exothermic reaction is initiated. When the reaction subsides, one-tenth part of palladium-on-carbon is introduced, whereupon the reaction mixture is filtered through diatomaceous earth. From the filtrate, on chilling, 4'-ethylsulfonylacetophenone precipitates. The product is isolated by filtration and dried in air.

B. 4'-Ethylsulfonyl-2-(2-ethyl-1-imidazolyl)-acetophenone. Substitution of 117 parts of 4'-ethylsulfonylacetophenone and 247 parts of 2-ethylimidazole for the 4'-methylsulfonylacetophenone and imidazole, respectively, called for in Example 15A affords, by the procedure there detailed, 4'-ethylsulfonyl-2-(2-ethyl-1-imidazolyl)acetophenone.

C. 2-Ethyl-α-(4-ethylsulfonylphenyl)-1-imidazole-ethanol. Substitution of 584 parts of 4'-ethylsulfonyl-2-(2-ethyl-1-imidazolyl)acetophenone for the 2-(1-imidazolyl)-4'-methylsulfonylacetophenone monohydrate called for in Example 15B affords, by the procedure there detailed, 2-ethyl-α-(4-ethylsulfonylphenyl)-1-imidazoleethanol.

D. 1-(β-Chloro-4-ethylsulfonylphenethyl)-2-ethylimidazole. Substitution of 359 parts of 2-ethyl-α-(4-ethylsulfonylphenyl)-1-imidazoleethanol for the α-(4-methylsulfonylphenyl)-1-imidazoleethanol called for in Example 15C affords, by the procedure there detailed, 1-(β-chloro-4-ethylsulfonylphenethyl)-2-ethylimidazole. The product has the formula

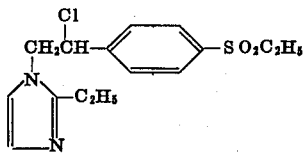

What is claimed is:
1. A compound of the formula

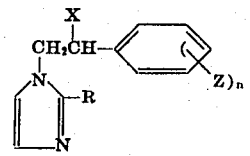

wherein X represents chlorine or bromine; Z represents hydrogen, methyl, halogen, nitro, methoxy, or (lower alkyl)-sulfonyl; n represents a positive integer less than 3; and R represents hydrogen or lower alkyl.

2. A compound according to claim 1 having the formula

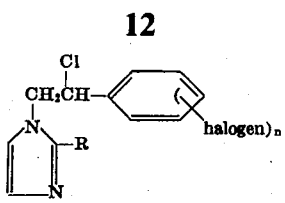

wherein n represents a positive integer less than 3 and R represents hydrogen or methyl.

3. A compound according to Claim 1 having the formula

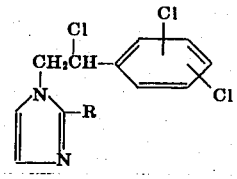

wherein R represents hydrogen or methyl.

4. A compound according to claim 1 which is 1-(2,4,β-trichlorophenethyl)imidazole.

5. A compound according to claim 1 having the formula

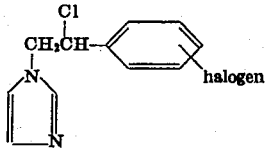

6. A compound according to claim 1 having the formula

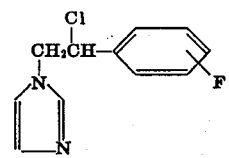

7. A compound according to claim 1 which is 1-(β-chloro-2-fluorophenethyl)imidazole.

8. A compound according to claim 1 which is 1-(β-chloro-4-nitrophenethyl)imidazole.

9. A compound according to claim 1 which is 1-(β-chloro-2-methoxyphenethyl)imidazole.

10. A compound according to claim 1 having the formula

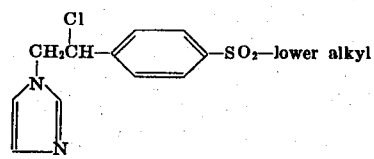

11. A compound according to claim 1 which is 1-(β-chloro-4-methylsulfonylphenethyl)imidazole.

* * * * *